US008909620B2

(12) United States Patent
Argue et al.

(10) Patent No.: US 8,909,620 B2
(45) Date of Patent: *Dec. 9, 2014

(54) SEARCHING DIGITAL RECEIPTS AT A MOBILE DEVICE

(71) Applicant: Wal-Mart Stores, Inc., Bentonville, AR (US)

(72) Inventors: Stuart Argue, Palo Alto, CA (US); Anthony Emile Marcar, San Francisco, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/633,761

(22) Filed: Oct. 2, 2012

(65) Prior Publication Data

US 2014/0095481 A1     Apr. 3, 2014

(51) Int. Cl.
 *G06F 17/30*     (2006.01)

(52) U.S. Cl.
 USPC .......................................... 707/722; 707/768

(58) Field of Classification Search
 CPC ... G06F 9/466; G06F 21/34; G06F 17/30424; G06F 11/0748; G06Q 20/20; G06Q 30/0238; G06Q 20/322; G06Q 30/06; G06Q 20/32
 USPC ..................... 707/722, 768; 705/14.38, 14.64
 See application file for complete search history.

(56) References Cited

U.S. PATENT DOCUMENTS

| | | | |
|---|---|---|---|
| 6,898,598 B2 | 5/2005 | Himmel | |
| 7,552,087 B2 | 6/2009 | Schultz | |
| 7,555,476 B2 | 6/2009 | Holbrook | |
| 7,827,077 B2 | 11/2010 | Shiftan | |
| 8,095,439 B1 | 1/2012 | Harman | |
| 8,112,356 B2 | 2/2012 | Schultz | |
| 8,527,367 B2 | 9/2013 | Blank | |
| 8,583,512 B1 | 11/2013 | Gupta | |
| 2003/0033272 A1* | 2/2003 | Himmel et al. | 707/1 |
| 2006/0219774 A1* | 10/2006 | Benco et al. | 705/16 |
| 2007/0164106 A1 | 7/2007 | McDevitt | |
| 2008/0177624 A9* | 7/2008 | Dohse | 705/14 |
| 2009/0271265 A1 | 10/2009 | Lay | |
| 2011/0016043 A1* | 1/2011 | Dornseif | 705/39 |
| 2011/0125598 A1* | 5/2011 | Shin et al. | 705/17 |

(Continued)

FOREIGN PATENT DOCUMENTS

| | | |
|---|---|---|
| EP | 1185945 A2 | 3/2002 |
| WO | WO2007134378 A1 | 11/2007 |

*Primary Examiner* — Rehana Perveen
*Assistant Examiner* — Tiffany Thuy Bui
(74) *Attorney, Agent, or Firm* — David P. Stevens; Stevens Law Group

(57) ABSTRACT

The present invention extends to methods, systems, and computer program products for searching digital receipts at a mobile device. A customer mobile device receives and stores one or more digital receipts. The one or more digital receipts correspond to transactions conducted with a merchant. A user can select search criteria for searching stored digital receipts. The search criteria can be applied to stored digital receipts. Any stored digital receipts that satisfy the search criteria can be returned for display. In some embodiments, search criteria are selected to search for digital receipts associated with a specified payment method, such as, for example, cash, check, credit card, debit card, gift card, etc. In other embodiments, search criteria are selected to search for digital receipts having a purchase date within a specified purchase date range.

18 Claims, 7 Drawing Sheets

(56) References Cited

U.S. PATENT DOCUMENTS

| | | | |
|---|---|---|---|
| 2011/0184822 A1* | 7/2011 | Matkovic | 705/18 |
| 2011/0302083 A1* | 12/2011 | Bhinder | 705/44 |
| 2012/0084135 A1* | 4/2012 | Nissan et al. | 705/14.38 |
| 2012/0084391 A1 | 4/2012 | Patel | |
| 2012/0109693 A1* | 5/2012 | Smith | 705/4 |
| 2012/0160911 A1 | 6/2012 | Smith | |
| 2012/0290422 A1* | 11/2012 | Bhinder | 705/21 |
| 2012/0290609 A1* | 11/2012 | Britt | 707/769 |
| 2014/0074675 A1 | 3/2014 | Calman | |

* cited by examiner

SEARCHING DIGITAL RECEIPTS AT A MOBILE DEVICE

CROSS-REFERENCE TO RELATED APPLICATIONS

This application is related to U.S. application Ser. No. 13/633,767, filed Oct. 2, 2012.

BACKGROUND

1. Field of the Invention

This invention relates generally to the field of electronic sales transactions, and, more particularly, to searching digital receipts at a mobile device.

2. Related Art

In a variety of transactions, consumers or buyers of goods or services typically receive receipts from their respective merchants or service providers as proof of existence of conducted transactions. Generally, receipts are issued by merchants and service providers for a number of reasons including, for example, regulatory or tax reasons and convenience purposes. A receipt provides information about a corresponding transaction for the purpose of providing all participants with a trace or record of the transaction. Receipts can later be used by a consumer for various purposes including, for example, proving participation in a transaction for tax reporting purpose, product returns, use as a claim ticket for a further transaction, provisioning warranties, etc. Depending on a variety of factors, such as, for example, items being purchased, business or personal purchase, amount of purchase, etc., a consumer may desire an electronic receipt and/or a paper receipt.

For in-store purchases, consumers generally obtain a paper receipt at the point-of-sale. However, some point-of-sale systems also support the delivery of digital receipts at the point-of-sale. Further, for telephone or online purchases digital receipts are typically delivered to a customer.

However, receipt delivery mechanisms are somewhat rigid and may not allow a user to configure desired receipt types (e.g., digital and/or paper) for use at checkout. For example, a conventional point-of-sale ("POS") system typically includes a POS terminal, one or more peripheral devices (display monitor, receipt printer, barcode scanner, weigh scale, electronic signature pad) and a payment processor with pin pad (for credit and debit cards). The data for sales transactions is usually stored in a storage device of the POS terminal, which may be uploaded to one of the remote transaction authorization server or another remote server of the credit/debit card companies. Although POS systems are well equipped for merchants to monitor and collect transaction data from the POS system, the ability of the customer to input or extract useful information from the POS system is typically limited to pinpad interactions (entering tip amounts, obtaining additional cash back, etc.), and obtaining printed receipts, the format and content of which has been pre-determined by the merchant.

Even when digital receipts are generated, the digital receipts may be in a pre-configured format that is neither adjustable not searchable. For example, digital receipts can be images of paper receipts that are provided to a customer at the POS system. The digital receipts can include a store identifier, a receipt identifier, a date and time of purchase, and various receipt items having item identifiers and item information. The receipt items are typically listed sequentially based on their scan order (i.e., the order the cashier scanned the items). Since the digital receipt is an image file, a customer is limited with respect to performing further operations based on the content of the digital receipt. For example, a user may be limited simply to viewing the digital receipt.

Some POS systems may be capable of generating digital receipts as separate digital data. However, POS systems are typically sold with a proprietary on-board software system that may be specific to the merchant's business. The merchant is able to make minor programming adjustments to add discount codes and other special offers, but has limited ability to add functionality to the POS system. Thus, even if digital receipts are provided as separate digital data, a customer typically has limited, if any, ability to change how digital receipt data is viewed.

BRIEF DESCRIPTION OF THE DRAWINGS

The specific features, aspects and advantages of the present invention will become better understood with regard to the following description and accompanying drawings where.

DETAILED DESCRIPTION

Figure 1:
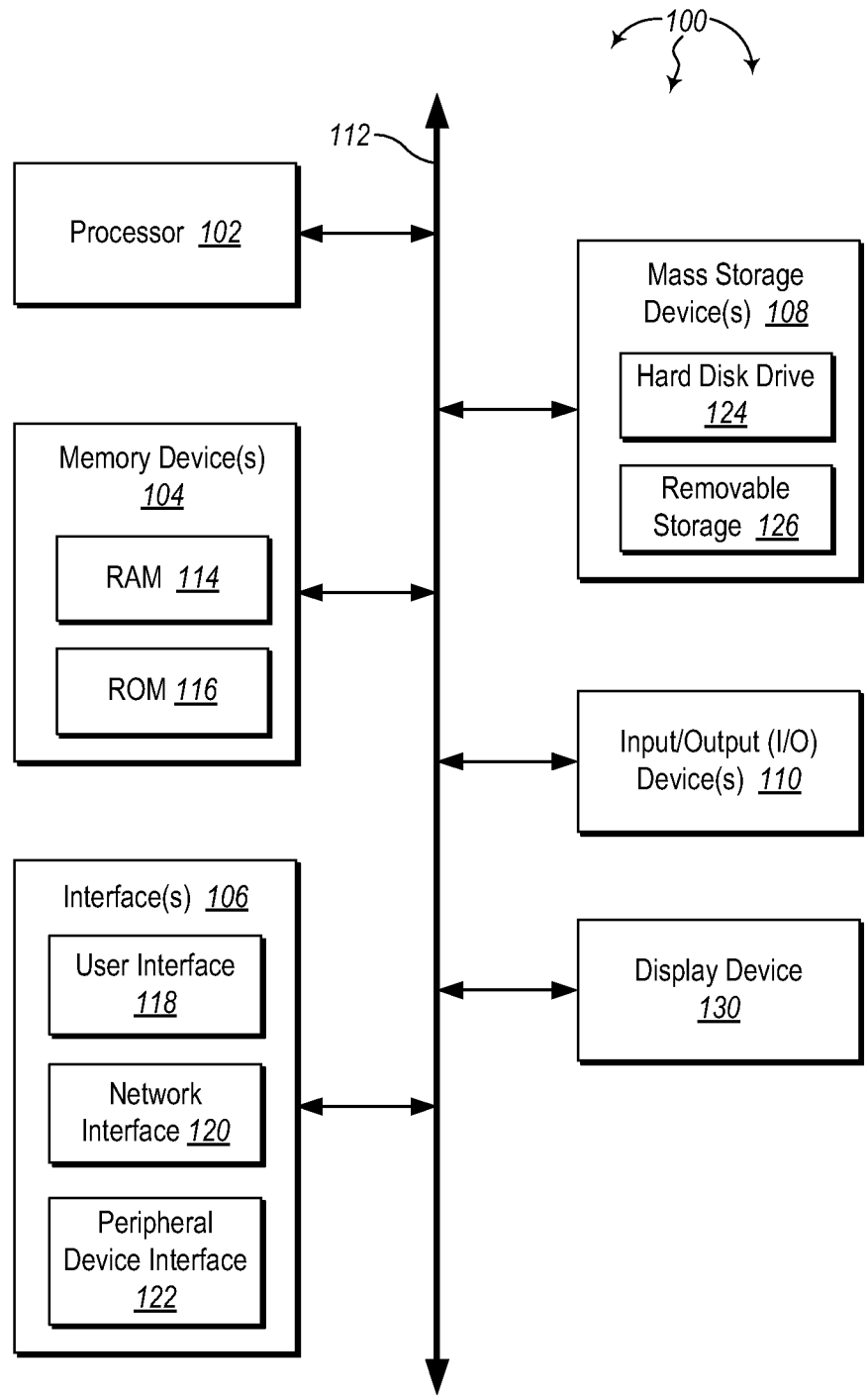
FIG. 1 illustrates an example block diagram of a computing device.

The present invention extends to methods, systems, and computer program products for searching digital receipts at a mobile device. In the following description of the present invention, reference is made to the accompanying drawings, which form a part hereof, and in which is shown by way of illustration specific embodiments in which the invention is may be practiced. It is understood that other embodiments may be utilized and structural changes may be made without departing from the scope of the present invention.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or PCIx based real time memory tiered Storage, such as FusionIO). Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

It is further noted that, where feasible, functions described herein can be performed in one or more of: hardware, software, firmware, digital components, or analog components. For example, one or more application specific integrated circuits ("ASICs") can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

In general, embodiments of the invention are directed to searching digital receipts at a mobile device. A customer mobile device receives and stores one or more digital receipts. The one or more digital receipts correspond to transactions conducted with a merchant. A user can select search criteria for searching stored digital receipts. The search criteria can be applied to stored digital receipts. Any stored digital receipts that satisfy the search criteria can be returned for display.

In some embodiments, search criteria are selected to search for digital receipts associated with a specified payment method, such as, for example, cash, check, credit card, debit card, gift card, etc. In other embodiments, search criteria are selected to search for digital receipts having a purchase date within a specified purchase date range.

Accordingly, mobile device users can search for receipts as desired to more efficiently perform specified tasks. For example, a user may wish to know how much was spent on groceries in the last month. As such, the user can select search criteria to search for receipts within a date range defining the last month. Alternately, the user may wish to know a dollar amount charged to credit cards. As such, the user can select search criteria to search for receipts where a credit card was used as the payment method.

FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory ("RAM") 114) and/or nonvolatile memory (e.g., read-only memory ("ROM") 116). Memory device(s) 104 may also include rewritable ROM, such as Flash memory.

Mass storage device(s) 108 include various computer readable media, such as magnetic tapes, magnetic disks, optical disks, solid state memory (e.g., Flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, cameras, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments. Example interface(s) 106 can include any number of different network interfaces 120, such as interfaces to personal area networks ("PANs"), local area networks ("LANs"), wide area networks ("WANs"), wireless networks (e.g., near field communication ("NFC"), Bluetooth, Wi-Fi, etc. networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Figure 2:
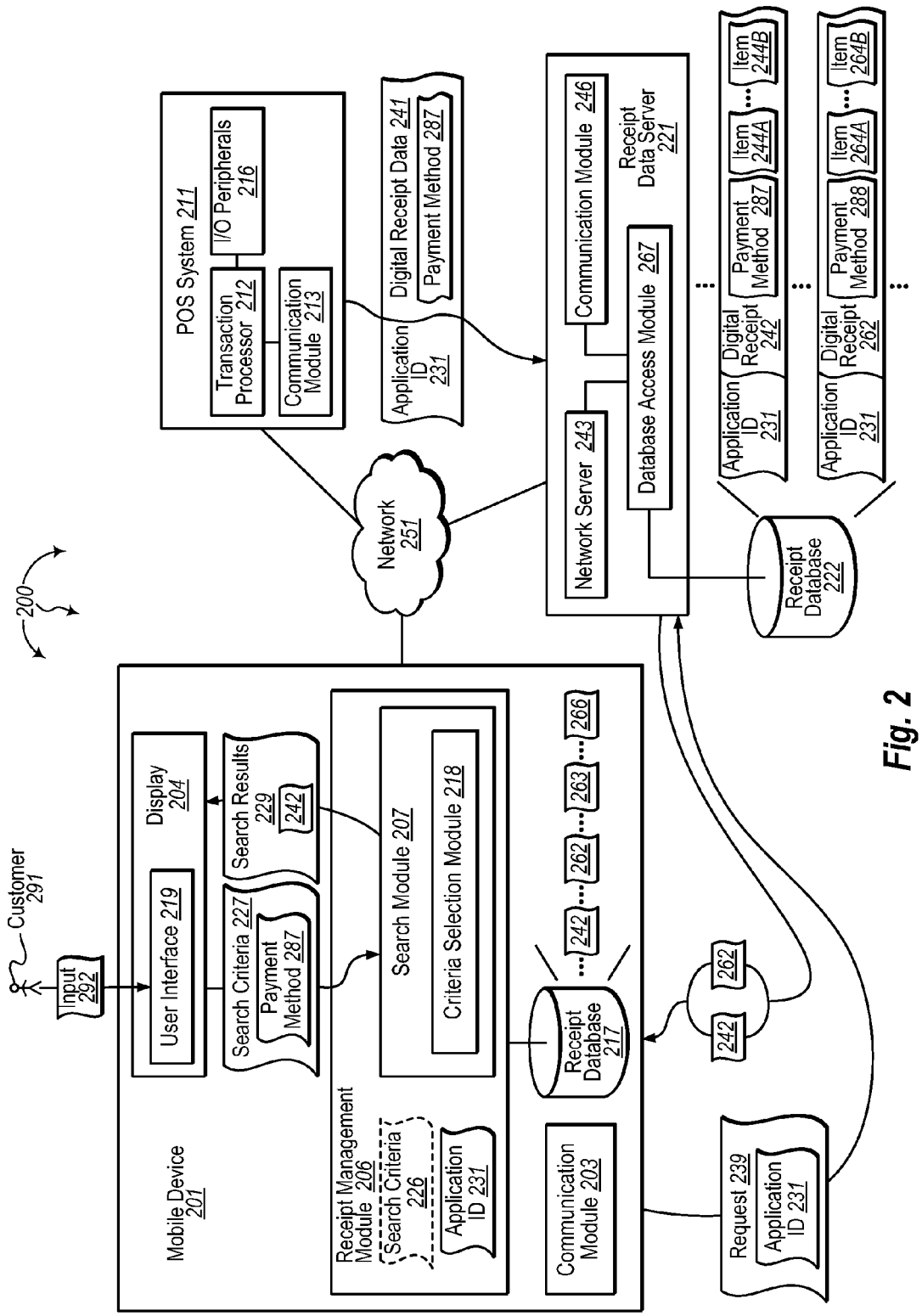
FIG. 2 illustrates an example computer architecture that facilitates searching digital receipts at a mobile device.

FIG. 2 illustrates an example computer architecture 200 that facilitates searching digital receipts at a mobile device. Referring to FIG. 2, computer architecture 200 includes mobile device 201, POS systems 211, and receipt database server 221. Each of the depicted components can be connected to one another over (or be part of) a network 251, such as, for example, a PAN, a LAN, a WAN, and even the Internet. Accordingly, each of the depicted components as well as any other connected computer systems and their components, can create message related data and exchange message related data (e.g., near field communication ("NFC") payloads, Bluetooth packets, Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

POS system 211 includes transaction processor 212, communication module 213, and I/O peripherals 216. POS system 211 can be physically located at a checkout lane in a store. Generally, transaction processor 212 is configured to manage sales transactions for POS 211. Transaction processor 212 can receive input from I/O peripherals 216 to open a sales transaction, collect receipt data (e.g., date, time, item, number of units, cost data, tax, department, payment method, etc.) for a sales transaction, and close a sales transaction. Receipt data for an item (e.g. item description, item cost, department, etc.) can be retrieved from an item database in response to scanning a barcode on (or otherwise identifying) the item. Other receipt data for an item (e.g., number of units, tax, payment method, etc.) can be determined by transaction processor 212. Payment method can include any of: cash, check, debit card, credit card, gift card, etc. I/O peripherals 216 can include one or more of: a monitor (e.g., a cashier-facing monitor), one or more input devices (e.g., scanners, keyboards, scales, or the like), one or more payment devices (e.g., cash drawers, card readers, etc.) for receiving or returning payments, and one or more output devices (e.g., customer-facing display or monitor, receipt printer, etc.).

POS system 211 can associate an application ID with digital receipt data, including payment method, for a transaction. The application ID can be a unique value identifying a mobile device. An application ID can be indicated to POS system 211, either manually by a customer or in an automated fashion by a mobile device, at the time of a transaction.

Communication module 213 can be a wired and/or wireless network adapter for connecting POS system 211 with a network, such as, for example, a Wi-Fi and/or wired Ethernet network, that facilitates a further connection to network 251 (e.g., the Internet).

POS system 211 can be at a physical store location along with additional POS systems including similar components. The physical store location may be owned by an entity, such as, for example, a retailer corporation that runs a chain of stores. The chain of stores can include one or more of: grocery stores, department stores, warehouse stores, discount stores, etc. In some embodiments, POS system 211 includes components in a checkout isle as well as components in a store based data center. Other POS systems, also including similar components, can be at other physical store locations owned by the entity.

Receipt data server 221 includes network (e.g., web) server 243, communication module 246, and database access module 267. Network server 243 is configured to communicate with external devices, such as, for example, mobile device 201. A common entity, such as, a retailer corporation, can own one or more physical store locations (e.g., a chain of stores) as well as receipt data server 221. Each of the one or more store physical locations can include one or more POS systems as well as other computer systems (e.g., local back-end servers). Communication module 246 can be configured to communicate with POS systems as well as other computer systems at each of the one or more physical store locations (e.g., on an internal corporate network) to facilitate business operations for the entity.

Receipt data server 221 can receive application identifiers and digital receipt data, including payment methods, from POS systems at various different store locations, including POS system 211. Receipt data server 221 can formulate digital receipts from received receipt data. Formulated digital receipts can include entries for items included in corresponding digital receipt data (but potentially in a different format, for example, a format deliverable to mobile devices). Formulated digital receipts can also contain other data related to a transaction, such as, for example, the payment method used for the transaction. Database access module 267 can store digital receipts along with application identifiers in receipt database 222.

For example, receipt data server 221 can receive application ID 231 along with digital receipt data 241 from POS system 211. Receipt data server 221 can formulate digital receipt 242 from digital receipt data 241. Digital receipt 242 includes payment method 287 and receipt entries for items 244A, 244B, etc. Receipt items 244A, 244B, etc. correspond to physical items purchased during a transaction at POS system 211. Digital receipt 242 can be stored along with application ID 231 to indicate that digital receipt 242 corresponds to mobile device 201.

In some embodiments, receipt data server 221 is part of a (e.g., regional, national, or global) backend system that receives receipt data from a plurality of POS systems distributed throughout different geographic locations and formulates corresponding digital receipts. The plurality of POS systems and the backend system can be part of a commonly owned and/or controlled corporate network infrastructure. For example, receipt data server 221 can formulate digital receipt 262 from digital receipt data received from another POS system. Digital receipt 262 includes payment method 288 and receipt entries for items 264A, 264B, etc. Receipt items 264A, 264B, etc. correspond to physical items purchased during a transaction at the other POS system. Digital receipt 262 can be stored along with application ID 231 to indicate that digital receipt 262 also corresponds to mobile device 201.

Subsequent to storing digital receipts, receipt data server 221 can send stored digital receipts to customer computing devices, such as, for example, smartphones and/or tablets. Receipt data server 221 can send digital receipts to a mobile device in response to a request and/or in accordance with configured settings. For example, in response to a request for receipts from mobile device 201, receipt data server 221 can send digital receipts 242 and 262 to mobile device 201. Sending digital receipts from receipt data server 221 to a mobile device can involve push or polled mechanisms. Receipt data server 221 can send digital receipts in a web or native view.

As depicted, mobile device 201 (e.g., a smartphone) communication module 203, display 204, receipt management module 206, and receipt database 217. In general, receipt management module 206 provides a user of mobile device 201 with various mechanisms for managing their digital receipts. Receipt management module 206 further includes search module 207. Search module 207 is configured to search digital receipts as desired by a user of mobile device 201. Receipt management module 206 can also be used to pair customer application ID 231 (e.g., derived from a loyalty number, a telephone number, a portion of a credit card number, etc.) with mobile device 201. As such, electronic receipts corresponding to application ID can be delivered to mobile device 201.

Receipt management module 206 can present user-interface 219 at display 204 (e.g., a general purpose display device). User-interface 206 can include (e.g., touch screen) user-interface controls allowing a user to select search criteria. Selected search criteria can be used by search module 207 to search digital receipts in receipt database 217. For example, customer 291 can enter input 292 to select search criteria requesting that digital receipts having a specified payment method be presented at user interface 219. Search module 207 can apply the selected search criteria to digital receipts in receipt database 217 to identify receipts having the specified payment method.

Thus, a user request for desired receipts can be accomplished by selecting search criteria through user interface 291. The search criteria are sent to search module 207. Search module 207 applies the search criteria to receipts in receipt database 217. Receipts matching the search criteria can be accessed from receipt database 217 and presented at user interface 219.

As depicted, arrangement module 207 includes criteria selection module 218. Criteria selection module 218 can present user interface controls to facilitate search criteria selection by a user. Criteria selection module 218 can present any of a wide variety of different user interface controls in different combinations, including, but not limited to: check boxes, radio buttons, lists, drop down lists, combo boxes, text boxes, date pickers, option buttons, sliders, etc. Criteria selection module 218 can receive search criteria selected through the presented user interface controls.

In some embodiments, network server 243 includes a search module. The search module can include a criteria selection module (similar to criteria selection module 218). The search module can be a standalone module or can inter-operate with search module 207 (e.g., in a hybrid manner) to search for receipts. The search module can include a web based user interface. A user, for example, customer 291 can interact with search module through the web based user interface. The arrangement module can provide a mobile web view of search results back to mobile device 201.

For example, customer 291 can select search criteria through a Web based interface provided by the search module. The search criteria can be sent to the search module via network communication. The search module can search for digital receipts in receipt database 222. The located digital receipts can be returned to mobile device 201 via network communication for presentation in a mobile web view.

Search criteria may be stored between searches. For example, customer 291 can select search criteria 227. Search criteria 227 can be persisted in receipt management module 206. Search criteria 227 can be used to search for digital receipts to display at user interface 219, for example, when receipt management module 206 is started up or when other search criteria have not been selected.

Receipt management module 206 can have receipt update functionality. From time to time, a user of mobile device 201 can use the receipt update functionality to request digital receipts from database server 221. For example, customer 291 can utilize the receipt update functionality to cause request 239 to be sent from to receipt database server 221. Request 239 can be sent to receipt database server 221 by way of communication module 203, network 251 or other known communication links. Request 239 includes application ID 231 and can also include other information such as a date range for the receipts, store identifier or other information. Application ID 231 can be used at receipt database server 221 to identify digital receipts corresponding to mobile device 201.

In response to request 239, database access module 267 can use application ID 231 to identify digital receipts 242 and 262 within receipt database 222. Database access module 267 can retrieve digital receipts 242 and 262 from receipt database 222. Receipt database server receipt database server 221 can return digital receipts 242 and 262 to mobile device 201. Digital receipts 242 and 262 can be sent to mobile device 201 by way of communication module 203, network 251 or other known communication links. Digital receipts 242 and 262 can be stored in receipt database 217.

Communication module 203 can be a wireless network adapter for connecting mobile device 201 with a wireless network, such as, for example, Wi-Fi and/or a cellular network (e.g., CDMA, GSM, iDen, etc.) that facilitates a further connection to network 251 (e.g., the Internet)

Figure 3:
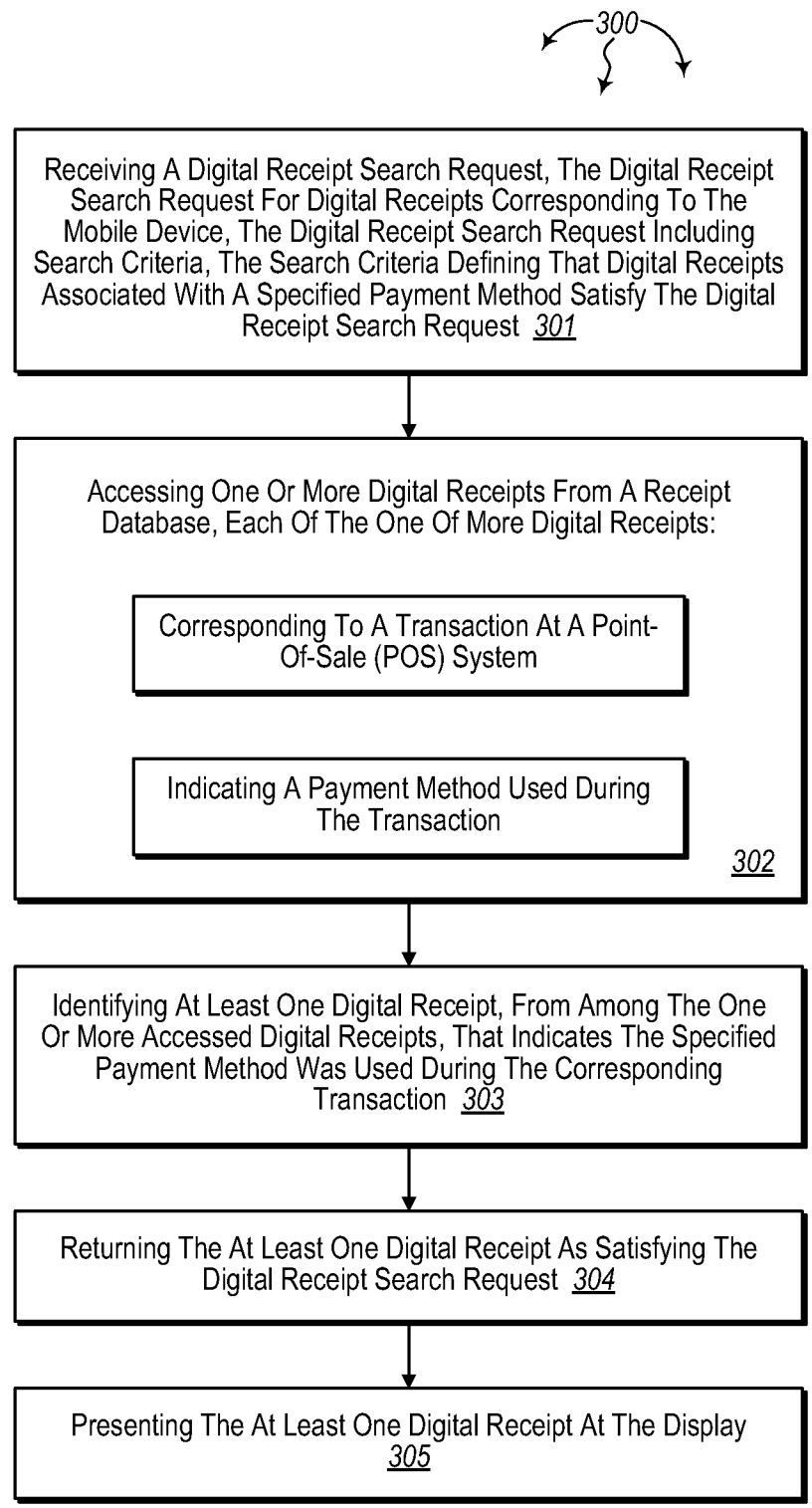
FIG. 3 illustrates a flow chart of an example method for searching digital receipts at a mobile device.

FIG. 3 illustrates a flow chart 300 of an example method 300 for searching digital receipts at a mobile device. Method will be described with respect to the components and data in computer architecture 200.

In general, method 300 can be used to search receipts at a mobile device. Receipts matching specified search criteria can be retrieved for presentation at display 204, such as, the screen of a mobile phone or tablet. A user (customer) can view digital receipts presented at display 204.

Mobile device 201 can send request 239, including application ID 231, to receipt data server 221. Receipt data server 221 can match application ID 231 to digital receipts 242 and 262. Receipt data server 221 can return digital receipts 242 and 262, including payment methods 287 and 288 respectively, to mobile device 201. Mobile device 201 can store digital receipts 242 and 262 along with other digital receipts, such as, for example, digital receipts 263, 266, etc., in receipt database 217. Each of the digital receipts in receipt database 217 can indicate a payment method used during a corresponding transaction.

Method 300 includes receiving a digital receipt search request, the digital receipt search request for digital receipts corresponding to the mobile device, the digital receipt search request including search criteria, the search criteria defining that digital receipts associated with a specified payment method satisfy the digital receipt search request (301). For example, customer 291 can submit input 292 to request searching of receipt database 217. Input 292 can be received at user interface 219. Within user interface 219, criteria selection module 218 can present user interface controls for selecting search criteria. Criteria selection module 218 can present user interface controls for multiple different selectable search criteria, including payment method, that can be selected by a user. As described, criteria selection module 218 can present any of a wide variety of different user interface controls in different combinations, including, but not limited to: check boxes, radio buttons, lists, drop down lists, combo boxes, text boxes, date pickers, option buttons, sliders, etc.

As such, customer 291, through input 292, can select search criteria 227, including payment method 228, using the presented user interface controls. Criteria selection module 218 can receive search criteria 227. Search criteria 227 defines that digital receipts associated with payment method 287 (e.g., any of cash, check, credit card, debit card, gift card, etc.) satisfy the search of digital receipts stored in receipt database 217. For example, customer 291 may want to view digital receipts associated with gift card payments.

Method 300 includes accessing one or more digital receipts from a receipt database (302). Each of the one or more digital receipts corresponding to a transaction at a Point-Of-Sale (POS) system and indicating a payment method used during the transaction. For example, search module 207 can access digital receipts 242, 262, 263, and 266 from receipt database 217. Each of digital receipts 242, 262, 263, and 266 can correspond to a transaction at a Point-Of-Sale (POS) system, such as, for example, POS system 211. Each of digital receipts 242, 262, 263, and 266 can also indicate a payment method (e.g., cash, check, credit card, debit card, gift card, etc.) used during the corresponding transaction.

Method 300 includes identifying at least one digital receipt, from among the one or more accessed digital receipts, that indicates the specified payment method was used during the corresponding transaction (303). For example, search module 207 can identify digital receipt 242 that indicates payment method 287 was used during the corresponding transaction. Search module 207 can also identify any other digital receipts that indicate payment method 287 was used during a corresponding transaction.

Method 300 includes returning the at least one digital receipt as satisfying the digital receipt search request (304). For example, search module 207 can return search results 229, including digital receipt 242, as satisfying search criteria 227. Other digital receipts that satisfy search criteria 227 (i.e., that indicate payment method 287) can also be included in search results 229. Method 300 includes presenting the at least one digital receipt at the display (305). For example, digital mobile device 201 can present search results 229, including digital receipt 242 and any other digital receipts satisfying search criteria 227, at user interface 219.

Embodiments of the invention also include deleting digital receipts that satisfy search criteria. Thus, after identifying at least one digital receipt (303), search module 207 can alternately delete the at least one digital receipt from receipt database 217. For example, search module 207 can delete digital receipt 242 from receipt database 217. When appropriate, search module 207 can also send instructions to receipt data server 221 to permanently delete digital receipt 242 from receipt database 217. For example, customer 291 may desire to delete all digital receipts where a credit card was used as the method of payment.

Figure 4:
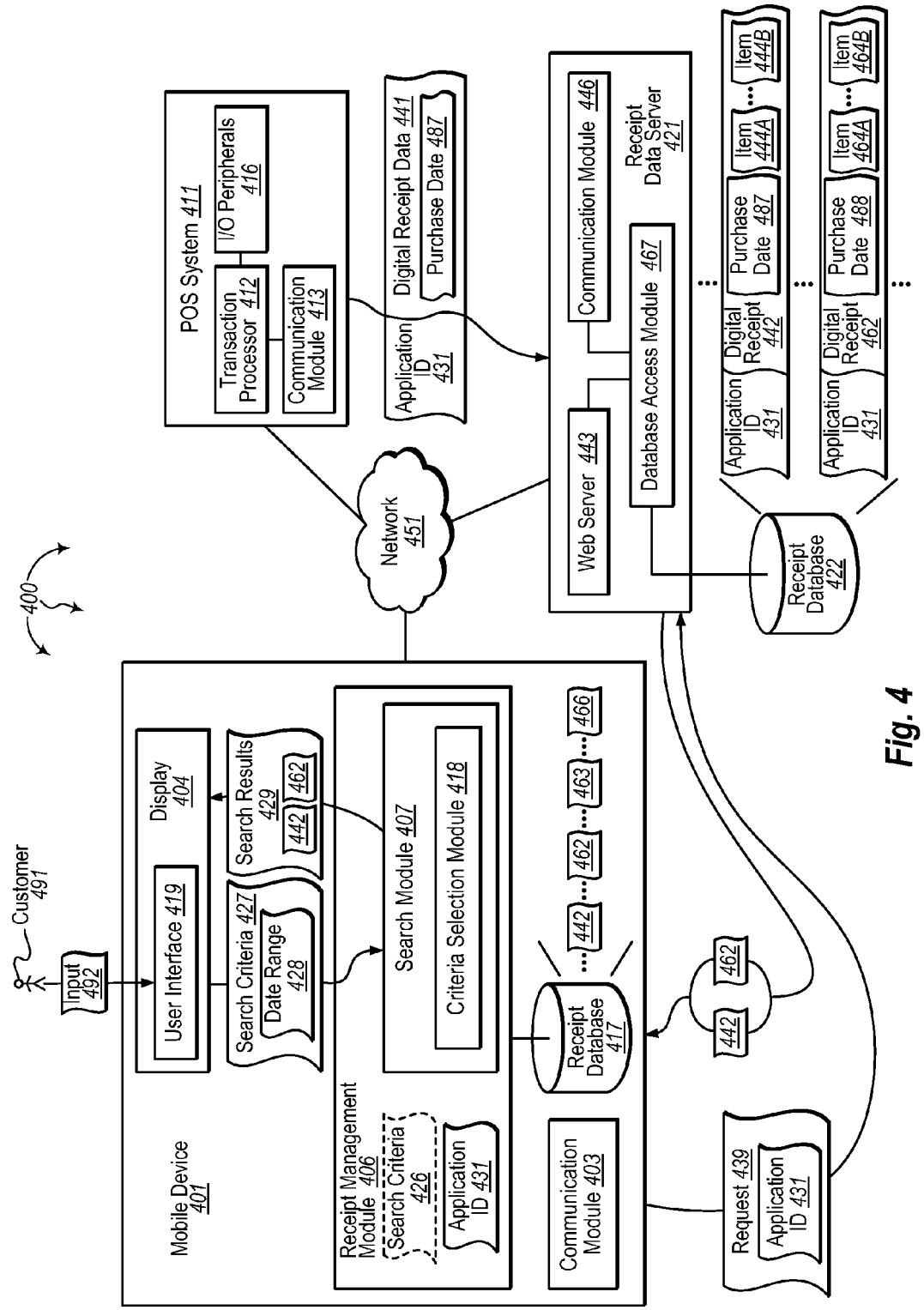
FIG. 4 illustrates an example computer architecture that facilitates searching digital receipts at a mobile device.

FIG. 4 illustrates an example computer architecture 400 that facilitates searching digital receipts at a mobile device. Referring to FIG. 4, computer architecture 400 includes mobile device 401, POS systems 411, and receipt database server 421. Each of the depicted components can be connected to one another over (or be part of) a network 451, such as, for example, a PAN, a LAN, a WAN, and even the Internet. Accordingly, each of the depicted components as well as any other connected computer systems and their components, can create message related data and exchange message related data (e.g., near field communication ("NFC") payloads, Bluetooth packets, Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

POS system 411 includes transaction processor 412, communication module 413, and I/O peripherals 416. POS system 411 can be physically located at a checkout lane in a store. Generally, transaction processor 412 is configured to manage sales transactions for POS 411. Transaction processor 412 can receive input from I/O peripherals 416 to open a sales transaction, collect receipt data (e.g., date, time, item, number of units, cost data, tax, department, purchase data, etc.) for a sales transaction, and close a sales transaction. Receipt data for an item (e.g. item description, item cost, department, etc.) can be retrieved from an item database in response to scanning a barcode on (or otherwise identifying) the item. Other receipt data for an item (e.g., number of units, tax, purchase date, etc.) can be determined by transaction processor 412. Purchase date can indicate a date and/or time a transaction was closed. I/O peripherals 416 can include one or more of: a monitor (e.g., a cashier-facing monitor), one or more input devices (e.g., scanners, keyboards, scales, or the like), one or more payment devices (e.g., cash drawers, card readers, etc.) for receiving or returning payments, and one or more output devices (e.g., customer-facing display or monitor, receipt printer, etc.).

POS system 411 can associate an application ID with digital receipt data, including purchase date, for a transaction. The application ID can be a unique value identifying a mobile device. An application ID can be indicated to POS system 411, either manually by a customer or in an automated fashion by a mobile device, at the time of a transaction.

Communication module 413 can be a wired and/or wireless network adapter for connecting POS system 411 with a network, such as, for example, a Wi-Fi and/or wired Ethernet network, that facilitates a further connection to network 451 (e.g., the Internet).

POS system 411 can be at a physical store location along with additional POS systems including similar components. The physical store location may be owned by an entity, such as, for example, a retailer corporation that runs a chain of stores. The chain of stores can include one or more of: grocery stores, department stores, warehouse stores, discount stores, etc. In some embodiments, POS system 411 includes components in a checkout isle as well as components in a store based data center. Other POS systems, also including similar components, can be at other physical store locations owned by the entity.

Receipt data server 421 includes Network (e.g., web) server 443, communication module 446, and database access module 473. Network server 443 is configured to communicate with external devices, such as, for example, mobile device 401. A common entity, such as, a retailer corporation, can own one or more physical store locations (e.g., a chain of stores) as well as receipt data server 421. Each of the one or more store physical locations can include one or more POS systems as well as other computer systems (e.g., local back-end servers). Communication module 446 can be configured to communicate with POS systems as well as other computer systems at each of the one or more physical store locations (e.g., on an internal corporate network) to facilitate business operations for the entity.

Receipt data server 421 can receive application identifiers and digital receipt data, including purchase date, from POS systems at various different store locations, including POS system 411. Receipt data server 421 can formulate digital receipts from received receipt data. Formulated digital receipts can include entries for items included in corresponding digital receipt data (but potentially in a different format, for example, a format deliverable to mobile devices). Formulated digital receipts can also contain other data related to a transaction, such as, for example, the purchase date corresponding to the transaction. Database access module 473 can store digital receipts along with application identifiers in receipt database 422.

For example, receipt data server 421 can receive application ID 431 along with digital receipt data 441 from POS system 411. Receipt data server 421 can formulate digital receipt 442 from digital receipt data 441. Digital receipt 442 includes purchase date 487 and receipt entries for items 444A, 444B, etc. Receipt items 444A, 444B, etc. correspond to physical items purchased during a transaction at POS system 411. Digital receipt 442 can be stored along with application ID 431 to indicate that digital receipt 442 corresponds to mobile device 401.

In some embodiments, receipt data server 421 is part of a (e.g., regional, national, or global) backend system that receives receipt data from a plurality of POS systems distributed throughout different geographic locations and formulates corresponding digital receipts. The plurality of POS systems and the backend system can be part of a commonly owned and/or controlled corporate network infrastructure. For example, receipt data server 421 can formulate digital receipt 462 from digital receipt data received from another POS system. Digital receipt 462 includes purchase date 488 and receipt entries for items 464A, 464B, etc. Receipt items 464A, 464B, etc. correspond to physical items purchased during a transaction at the other POS system. Digital receipt 462 can be stored along with application ID 431 to indicate that digital receipt 462 also corresponds to mobile device 401.

Subsequent to storing digital receipts, receipt data server 421 can send stored digital receipts to customer computing devices, such as, for example, smartphones and/or tablets. Receipt data server 421 can send digital receipts to a mobile device in response to a request and/or in accordance with configured settings. For example, in response to a request for receipts from mobile device 401, receipt data server 421 can send digital receipts 442 and 462 to mobile device 401. Sending digital receipts from receipt data server 421 to a mobile device can involve push or polled mechanisms. Receipt data server 421 can send digital receipts in a web or native view.

As depicted, mobile device 401 (e.g., a smartphone) communication module 403, display 404, receipt management module 406, and receipt database 417. In general, receipt management module 406 provides a user of mobile device 401 with various mechanisms for managing their digital receipts. Receipt management module 406 further includes search module 407. Search module 407 is configured to search digital receipts as desired by a user of mobile device 401. Receipt management module 406 can also be used to pair customer application ID 431 (e.g., derived from a loyalty number, a telephone number, a portion of a credit card number, etc.) with mobile device 401. As such, electronic receipts corresponding to application ID can be delivered to mobile device 401.

Receipt management module 406 can present user-interface 419 at display 404 (e.g., a general purpose display device). User-interface 406 can include (e.g., touch screen) user-interface controls allowing a user to select search criteria. Selected search criteria can be used by search module 407 to search digital receipts in receipt database 417. For example, customer 491 can enter input 492 to select search criteria requesting that digital receipts having a purchase date within a specified date range be presented at user interface 419. Search module 407 can apply the selected search criteria to digital receipts in receipt database 417 to identify receipts having a purchase date within the specified date range.

Thus, a user request for desired receipts can be accomplished by selecting search criteria through user interface 491. The search criteria are sent to search module 407. Search module 407 applies the search criteria to receipts in receipt database 417. Receipts matching the search criteria can be accessed from receipt database 417 and presented at user interface 419.

As depicted, arrangement module 407 includes criteria selection module 418. Criteria selection module 418 can present user interface controls to facilitate search criteria selection by a user. Criteria selection module 418 can present any of a wide variety of different user interface controls in different combinations, including, but not limited to: check boxes, radio buttons, lists, drop down lists, combo boxes, text boxes, date pickers, option buttons, sliders, etc. Criteria selection module 418 can receive search criteria selected through the presented user interface controls.

In some embodiments, network server 443 includes a search module. The search module can include a criteria selection module (similar to criteria selection module 418). The search module can be a standalone module or can interoperate with search module 407 (e.g., in a hybrid manner) to search for receipts. The search module can include a web based user interface. A user, for example, customer 491 can interact with search module through the web based user interface. The arrangement module can provide a mobile web view of search results back to mobile device 401.

For example, customer 491 can select search criteria through a Web based interface provided by the search module. The search criteria can be sent to the search module via network communication. The search module can search for digital receipts in receipt database 422. The located digital receipts can be returned to mobile device 401 via network communication for presentation in a mobile web view.

Search criteria may be stored between searches. For example, customer 491 can select search criteria 427. Search criteria 427 can be persisted in receipt management module 406. Search criteria 427 can be used to search for digital receipts to display at user interface 219, for example, when receipt management module 406 is started up or when other search criteria have not been selected.

Receipt management module 406 can have receipt update functionality. From time to time, a user of mobile device 401 can use the receipt update functionality to request digital receipts from database server 421. For example, customer 491 can utilize the receipt update functionality to cause request 439 to be sent from to receipt database server 421. Request 439 can be sent to receipt database server 421 by way of communication module 403, network 451 or other known communication links. Request 439 includes application ID 431 and can also include other information such as a date range for the receipts, store identifier or other information. Application ID 431 can be used at receipt database server 421 to identify digital receipts corresponding to mobile device 301.

In response to request 439, database access module 473 can use application ID 431 to identify digital receipts 442 and 462 within receipt database 422. Database access module 473 can retrieve digital receipts 442 and 462 from receipt database 422. Receipt database server receipt database server 421 can return digital receipts 442 and 462 to mobile device 401. Digital receipts 442 and 462 can be sent to mobile device 401 by way of communication module 403, network 451 or other known communication links. Digital receipts 442 and 462 can be stored in receipt data 417.

Communication module 403 can be a wireless network adapter for connecting mobile device 401 with a wireless network, such as, for example, Wi-Fi and/or a cellular network (e.g., CDMA, GSM, iDen, etc.) that facilitates a further connection to network 451 (e.g., the Internet)

Figure 5:
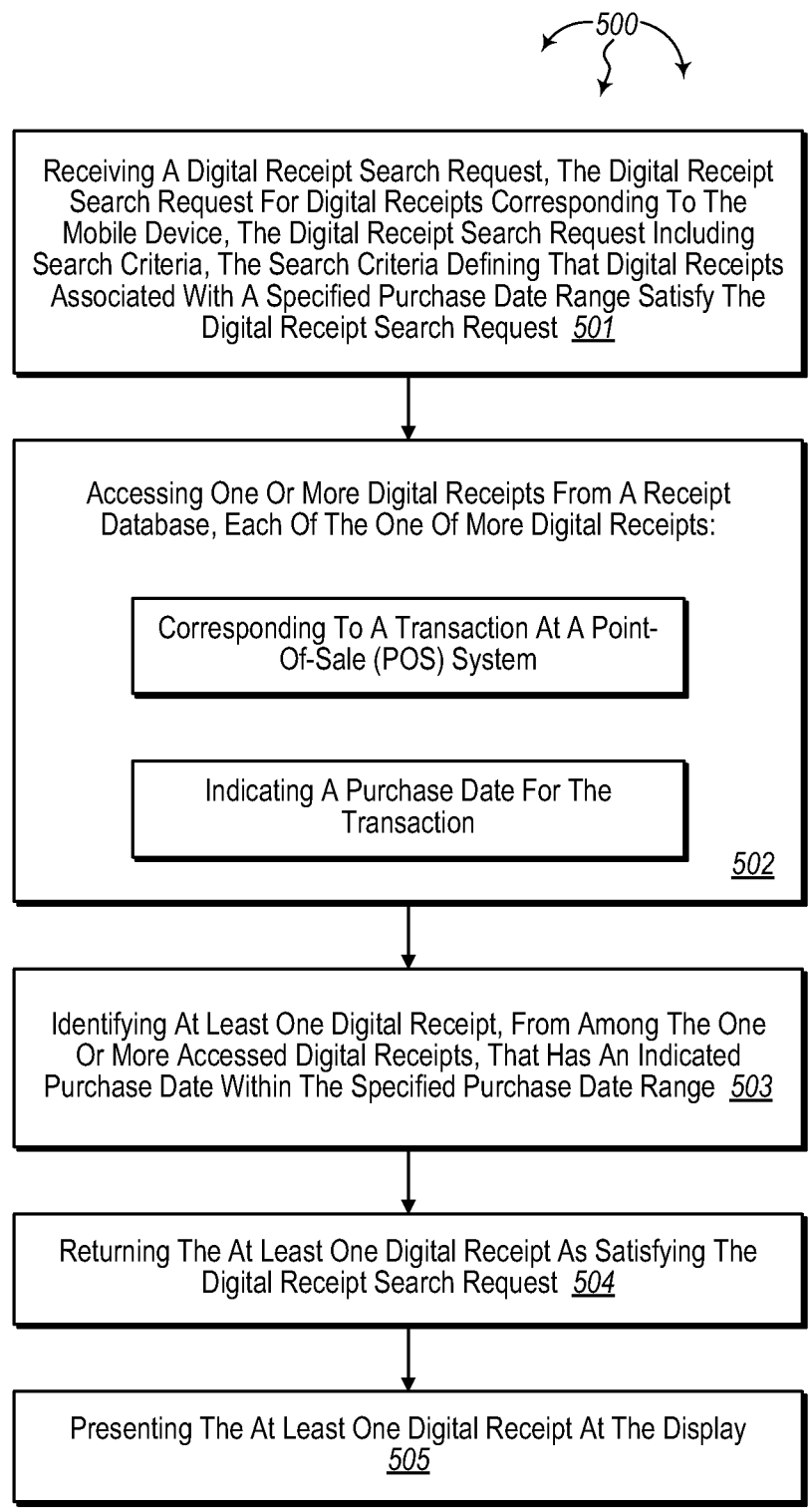
FIG. 5 illustrates a flow chart of an example method for searching digital receipt at a mobile device.

FIG. 5 illustrates a flow chart of an example method 500 for searching digital receipts at a mobile device. Method will be described with respect to the components and data in computer architecture 400.

In general, method 500 can be used to search receipts at a mobile device. Receipts matching specified search criteria can be retrieved for presentation at display 404, such as, the screen of a mobile phone or tablet. A user (customer) can view digital receipts presented at display 404.

Mobile device 401 can send request 439, including application ID 431, to receipt data server 421. Receipt data server 421 can match application ID 431 to digital receipts 442 and 462. Receipt data server 421 can return digital receipts 442 and 462, including purchase dates 487 and 488 respectively, to mobile device 401. Mobile device 401 can store digital receipts 442 and 462 along with other digital receipts, such as, for example, digital receipts 463, 466, etc., in receipt database 417. Each of the digital receipts in receipt database 417 can indicate a purchase date for a corresponding transaction.

Method 500 includes receiving a digital receipt search request, the digital receipt search request for digital receipts corresponding to the mobile device, the digital receipt search request including search criteria, the search criteria defining that digital receipts associated with a specified purchase date range satisfy the digital receipt search request (501). For example, customer 491 can submit input 492 to request searching of receipt database 417. Input 492 can be received at user interface 419. Within user interface 419, criteria selection module 418 can present user interface controls for selecting search criteria. Criteria selection module 418 can present user interface controls for multiple different selectable search criteria, including a purchase date range, that can be selected by a user. A purchase date range can include a beginning date and an ending date. In some embodiments, a purchase date range is entered by expressly defining each of the beginning date and ending date for the purchase date range. In other embodiments, short cuts can be used to specify a purchase date range as within the last month, within the last week, since the beginning of the year, etc. As described, criteria selection module 418 can present any of a wide variety of different user interface controls in different combinations, including, but not limited to: check boxes, radio buttons, lists, drop down lists, combo boxes, text boxes, date pickers, option buttons, sliders, etc.

As such, customer 491, through input 492, can select search criteria 427, including payment method 428, using the presented user interface controls. Criteria selection module 418 can receive search criteria 427. Search criteria 427 defines that digital receipts having a purchase date within purchase date range 428 satisfy the search of digital receipts stored in receipt database 417. For example, customer 491 may want to view digital receipts for all transactions within the last month.

Method 500 includes accessing one or more digital receipts from a receipt database (502). Each of the one of more digital receipts corresponding to a transaction at a Point-Of-Sale (POS) system indicating a purchase date for the transaction. For example, search module 407 can access digital receipts 442, 462, 463, and 466 from receipt database 417. Each of digital receipts 442, 462, 463, and 466 can correspond to a transaction at a Point-Of-Sale (POS) system, such as, for example, POS system 411. Each of digital receipts 442, 462, 463, and 466 can also indicate a purchase date (e.g., mm/dd/yyyy) for the corresponding transaction.

Method 500 includes identifying at least one digital receipt, from among the one or more accessed digital receipts, that has an indicated purchase date within the specified purchase date range (503). For example, search module 407 can identify digital receipts 442 and 462 as having indicated purchase dates 487 and 488 within purchase date range 428. Search module 407 can also identify any other digital receipts indicating a purchase date within purchase date range 428.

Method 500 includes returning the at least one digital receipt as satisfying the digital receipt search request (504). For example, search module 407 can return search results 429, including digital receipts 442 and 462, as satisfying search criteria 427. Other digital receipts that satisfy search criteria 427 (i.e., with a purchase date within purchase date range 428) can also be included in search results 429. Method 500 includes presenting the at least one digital receipt at the display (505). For example, digital mobile device 401 can present search results 429, including digital receipts 442, 462, and any other digital receipts satisfying search criteria 427, at user interface 419.

Embodiments also include deleting digital receipts that satisfy search criteria. Thus, after identifying at least one digital receipt (503), search module 407 can alternately delete the at least one digital receipt from receipt database 417. For example, search module 407 can delete digital receipts 442 and 462 from receipt database 417. When appropriate, search module 407 can also send instructions to receipt data server 421 to permanently delete digital receipt 442 from receipt database 417. For example, user 491 may desire to delete any digital receipts that area older than a specified date.

Figure 6:
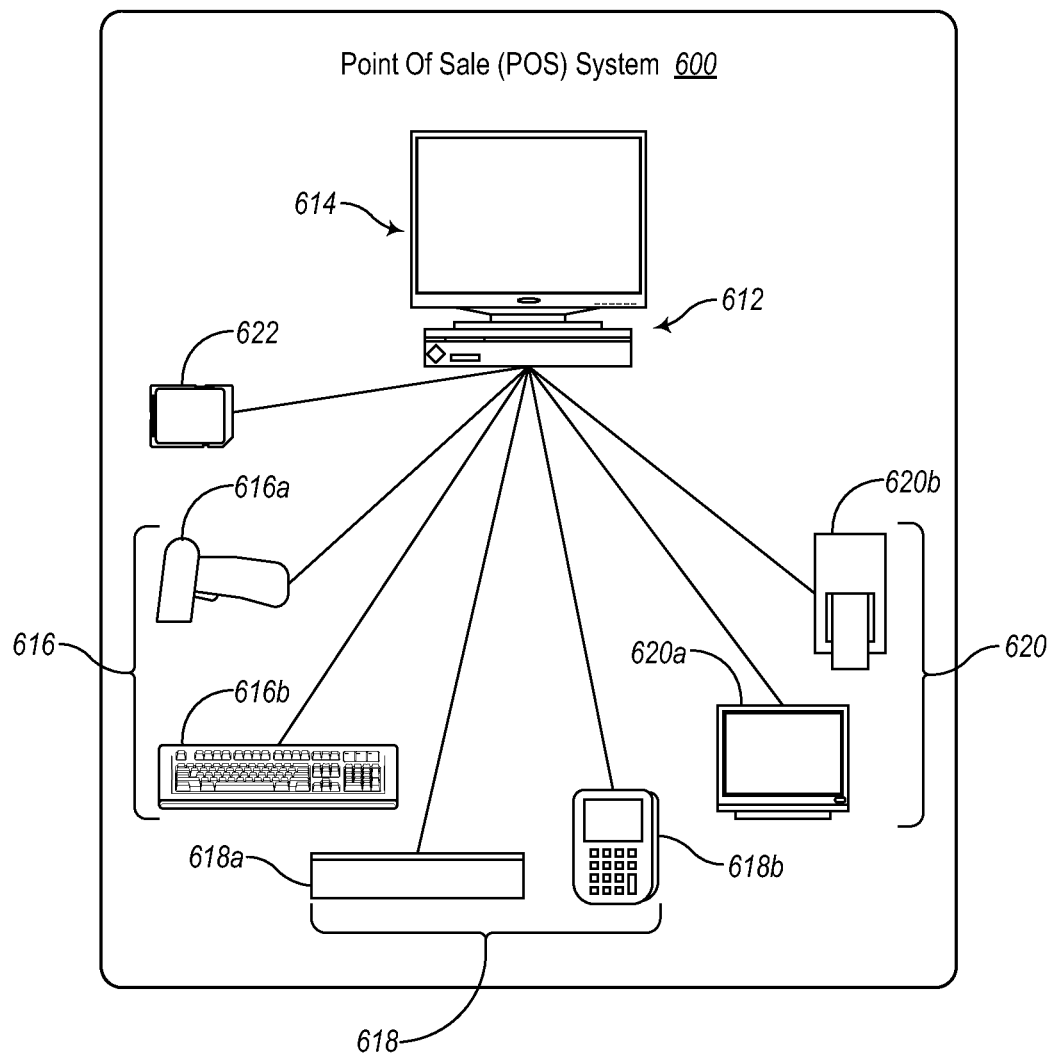
FIG. 6 illustrates an example schematic block diagram of a point-of-sale ("POS") system that creates receipts for mobile devices.

FIG. 6 illustrates an example schematic block diagram of a point-of-sale (POS) system 600. In some embodiments, the hardware, software, or hardware and software of POS system 600 may be configured to implement one or more methods in accordance with the present invention. For example, POS system 600 may be manufactured, programmed, modified, or upgraded to support transferring digital receipt data to mobile devices. Either of POS systems 211 and 411 can be a POS system similar to POS system 600.

POS system 600 can include various components. In some embodiments, POS system 600 includes a central or primary computer 612, a monitor 614 (e.g., a cashier-facing monitor 614), one or more input devices 616 (e.g., scanners 616a, keyboards 616b, scales, or the like), one or more payment devices 618 (e.g., cash drawers 618a, card readers 618b) for receiving or returning payments, one or more output devices 620 (e.g., customer-facing display 620a or monitor 620a, receipt printer 620b), or the like or combinations or sub-combinations thereof, and NFC module 622, such as, for example, an NFC dongle.

Computer 612 may form the backbone of POS system 610. Other components 616, 618, 620, 622 forming part of a POS system 610 can communicate with computer 612. Input devices 616 and certain payment devices 618 can feed data and commands to computer 612 for processing or implementation. For example, scanner 616a can pass data communicating the identity of one or more items to be purchased, returned, or the like to a computer 612. Similarly, card reader 618b can pass payment information to computer 612.

On the other hand, output devices 620 and certain payment devices 618 can follow or implement commands issued by computer 612. For example, cash drawer 618a may open in accordance with the commands of computer 612. Similarly, customer-facing display 620a and receipt printer 620b can display or output data or information as instructed by computer 612.

In some embodiments, in addition to handling consumer transactions (e.g., purchases, returns), POS system 600 can provide or support certain "back office" functionality. For example, POS system 600 can provide or support inventory control, purchasing, receiving and transferring products, or the like. POS system 600 can also store sales and customer information for reporting purposes, marketing purposes, receivables management, trend analysis, cost analysis, price analysis, profit analysis, or the like. If desired or necessary, POS system 600 can include an accounting interface to pass certain information to one or more in-house or independent accounting applications.

Figure 7:
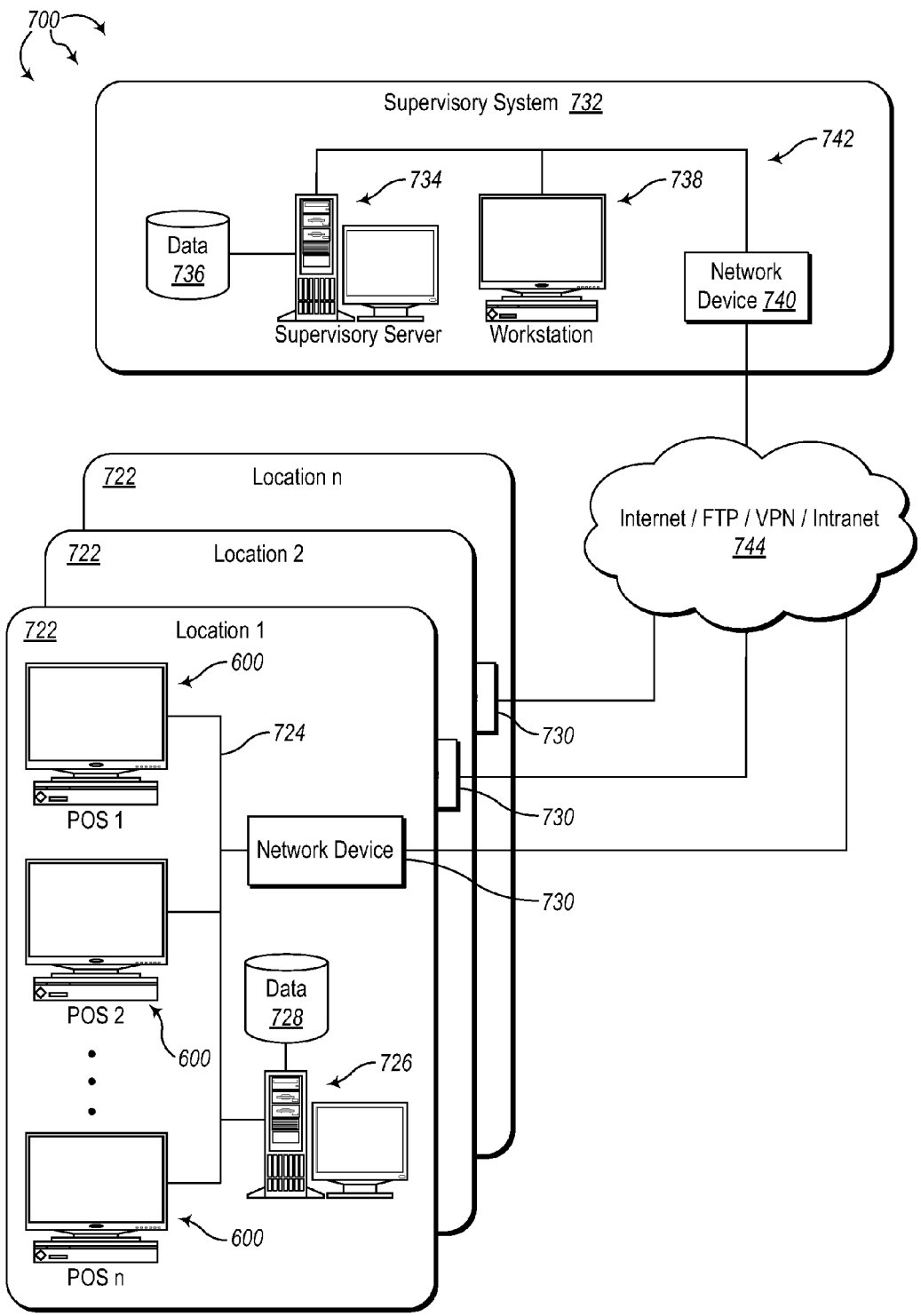
FIG. 7 illustrates an example schematic block diagram of a network of point-of-sale ("POS") systems that creates receipts for mobile devices.

In some embodiments, POS system 600 operates substantially independently, as a stand-alone unit. Alternately, POS system 600 may be one of several POS systems 600 forming the front line of a larger system. FIG. 7 illustrates an example schematic block diagram of a network 700 of point-of-sale (POS) systems 1000. For example, multiple POS systems 1000 may operate at a particular location 722 (e.g., within a retail, brick-and-mortar store). In such embodiments, the various POS systems 600 may be interconnected via LAN 724. LAN 724 may also connect the POS systems 700 to a local server 726.

Local server 726 can support the operation of the associated POS systems 600. For example, a server 726 may provide a central repository from which certain data needed by the associated POS systems 600 may be stored, indexed, accessed, or the like. Server 726 can serve certain software to one or more POS systems 600. In certain embodiments, a POS system 600 can offload certain tasks, computations, verifications, or the like to server 726.

Alternatively, or in addition thereto, server 726 can support certain back office functionality. For example, server 726 can receive and compile (e.g., within an associated database 728) data from the various associated POS systems 600 to provide or support inventory control, purchasing, receiving and transferring products, or the like. Server 726 can also receive and compile sales and customer information for reporting purposes, marketing purposes, receivables management, trend analysis, cost analysis, price analysis, profit analysis, or the like.

In some embodiments, one or more POS systems 600 and/or servers 726 corresponding to a particular location 722 can communicate with or access one or more remote computers or resources via one or more network devices 730. For example, a network device 730 can enable a POS system 600 to contact outside resources and verify the payment credentials (e.g., credit card information) provided by a customer. A network device 730 can comprise a modem, router, or the like.

In selected embodiments, POS systems 600 operate within an enterprise-wide system 731 comprising multiple locations 722 (e.g., branches 722 or stores 722). In such embodiments, each location 722 may have one or more POS systems 600, local servers 726, local databases 728, network devices 730, or the like or combinations or sub-combinations thereof connected by a computer network (e.g., a LAN 724). It may be that any of data receipt servers 221 and 421 are included in and/or include the functionality of a local server 726.

Additionally, each such location 722 may be configured to interact with one or more supervisory systems 732. For example, multiple branch locations 722 may report to an associated "headquarters" location or system. It may be that any of data receipt servers 221 and 421 are included in and/or include the functionality of a supervisory system 732.

A supervisory system 732 can include one or more supervisory servers 734, databases 736, workstations 738, network devices 740, or the like or combinations or sub-combinations thereof. The various components of a supervisory system 732 can be interconnected via a computer network (e.g., a LAN 742). In selected embodiments, a supervisory system 732 includes one or more supervisory servers 734 providing a central repository from which certain data needed by the one or more POS systems 700 or local servers 726 may be stored, indexed, accessed, or the like.

Alternatively, or in addition thereto, a supervisory server 734 can receive and compile (e.g., within an associated database 736) data from the various associated POS systems 600 or local servers 726 to provide or support inventory control, purchasing, receiving and transferring products, or the like. A supervisory server 734 may also receive and compile sales and customer information for reporting purposes, marketing purposes, receivables management, trend analysis, cost analysis, price analysis, profit analysis, or the like.

A supervisory system 732 can be connected to one or more associated locations 722 or branches 722 in via any suitable computer network 744 (e.g., WAN 744). For example, in selected embodiments, one or more locations 722 can connect to a supervisor system 732 via the Internet. Communication over such a network 744 can follow any suitable protocol or security scheme. For example, communication may utilize the File Transfer Protocol (FTP), a virtual private network (VPN), intranet, or the like.

Although the components and modules illustrated herein are shown and described in a particular arrangement, the arrangement of components and modules may be altered to process data in a different manner. In other embodiments, one or more additional components or modules may be added to the described systems, and one or more components or modules may be removed from the described systems. Alternate embodiments may combine two or more of the described components or modules into a single component or module.

The foregoing description has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the invention.

Further, although specific embodiments of the invention have been described and illustrated, the invention is not to be limited to the specific forms or arrangements of parts so described and illustrated. The scope of the invention is to be defined by the claims appended hereto, any future claims submitted here and in different applications, and their equivalents.

What is claimed:

1. A method of searching digital receipts, the method comprising:
   storing, on a mobile computing device carried by a customer, a receipt database containing a plurality of digital receipts, each digital receipt thereof documenting a different transaction conducted by the customer;
   conducting a first search of the receipt database while the receipt database is stored on the mobile computing device, the searching comprising:
      receiving, by the mobile computing device from the customer, a digital receipt search request, the digital receipt search request including search criteria, the search criteria defining that digital receipts associated with a specified payment method satisfy the digital receipt search request;
      accessing, by the mobile computing device, one or more digital receipts from the receipt database, each of the one of more digital receipts:
         corresponding to a transaction at a Point-Of-Sale (POS) system; and
         indicating a payment method used during the transaction;
      identifying, by the mobile computing device, at least one digital receipt, from among the one or more accessed digital receipts, that indicates the specified payment method was used during the corresponding transaction; and
      returning, by the mobile computing device, the at least one digital receipt as satisfying the digital receipt search request;
   presenting, by the mobile computing device, the at least one digital receipt to the customer via a display of the mobile computing device;
   storing, by the mobile computing device, the search criteria; and
   conducting, subsequent to the first search, a second search of the receipt database using the search criteria by default.

2. The method of claim 1, wherein the receiving the digital receipt search request comprises receiving user input at one or more user interface controls presented on a user interface at the display.

3. The method of claim 2, wherein the presenting the at least one digital receipt at the display comprises presenting the at least one digital receipt on the user interface.

4. The method as recited in claim 1, wherein the receiving the digital receipt search request comprises receiving search criteria defining that digital receipts associated with cash payments satisfy the digital receipt search request.

5. The method as recited in claim 1, wherein the receiving the digital receipt search request comprises receiving search criteria defining that digital receipts associated with at least one of a credit card payment and a debit card payment satisfy the digital receipt search request.

6. The method as recited in claim 1, wherein the receiving the digital receipt search request comprises receiving search criteria defining that digital receipts associated with a gift card payment satisfy the digital receipt search request.

7. The method as recited in claim 1, wherein the identifying the at least one digital receipt comprises identifying at least one digital receipt that indicates cash was used as a payment method.

8. The method as recited in claim 1, wherein the identifying the at least one digital receipt comprises identifying at least one digital receipt that indicates at least one of a credit card and a debit card was used as a payment method.

9. The method as recited in claim 1, wherein the identifying the at least one digital receipt comprises identifying at least one digital receipt that indicates a gift card was used as a payment method.

10. The method of claim 1, wherein the returning the at least one digital receipt comprises returning a plurality of digital receipts where one of the following was used as a payment method: cash, check, credit card, debit card, and gift card.

11. A mobile computing device comprising:
    a processor;
    memory operably connected to the processor;
    the memory storing a receipt database containing a plurality of digital receipts, each digital receipt thereof documenting a different transaction completed between a retailer and a proprietor of the mobile computing device; and
    the memory further storing executables programmed to:
       conduct a first search the receipt database, while the receipt database is stored on the mobile computing device, by
          receiving, from the proprietor, a digital receipt search request, the digital receipt search request including search criteria, the search criteria defining that digital receipts associated with a specified payment method satisfy the digital receipt search request;
          accessing one or more digital receipts from the receipt database, each of the one of more digital receipts:
             corresponding to a transaction at a Point-Of-Sale (POS) system; and
             indicating a payment method used during the transaction;
          identifying at least one digital receipt, from among the one or more accessed digital receipts, that indicates the specified payment method was used during the corresponding transaction; and
          returning the at least one digital receipt as satisfying the digital receipt search request;
       present the at least one digital receipt to the proprietor via a display of the mobile computing device;
       store the search criteria; and
       conduct, subsequent to the first search, a second search of the receipt database using the search criteria by default.

12. The mobile computing device of claim 11, wherein the memory further stores computer-executable instructions that, when executed, cause the mobile device to receive the search criteria at one or more user interface controls presented on a user interface at the display.

13. The mobile computing device of claim 12, wherein the memory further stores computer-executable instructions that, when executed, cause the mobile device to present the at least one digital receipt on the user interface.

14. The mobile computing device of claim 11, wherein the memory further stores computer-executable instructions that, when executed, cause the mobile device to identify at least one digital receipt that used one of the following payment methods: cash, check, credit card, debit card, and gift card.

15. The mobile computing device of claim 11, wherein the executables comprise a communication module configured to request and receive the plurality of digital receipts from a remote receipt data server.

16. The mobile computing device of claim 15, wherein the remote receipt data server is proprietary to the retailer.

17. The mobile computing device of claim 16, wherein the communication module is proprietary to the retailer.

18. The mobile computing device of claim 17, wherein:
the receipt database and the communication module form part of an application installed on the mobile computing device; and
the application is proprietary to the retailer.

* * * * *